United States Patent
Kubo et al.

(10) Patent No.: US 11,319,875 B2
(45) Date of Patent: May 3, 2022

(54) COMPRESSED AIR ENERGY STORAGE POWER GENERATION DEVICE

(71) Applicant: KOBE STEEL, LTD., Hyogo (JP)

(72) Inventors: Yohei Kubo, Kobe (JP); Masaki Matsukuma, Takasago (JP); Yuji Matsuo, Takasago (JP); Takashi Sato, Takasago (JP); Ryo Nakamichi, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 454 days.

(21) Appl. No.: 16/498,613

(22) PCT Filed: Mar. 15, 2018

(86) PCT No.: PCT/JP2018/010316
§ 371 (c)(1),
(2) Date: Sep. 27, 2019

(87) PCT Pub. No.: WO2018/193769
PCT Pub. Date: Oct. 25, 2018

(65) Prior Publication Data
US 2020/0340399 A1 Oct. 29, 2020

(30) Foreign Application Priority Data
Apr. 21, 2017 (JP) .............................. JP2017-084718

(51) Int. Cl.
*H02J 15/00* (2006.01)
*F02C 6/16* (2006.01)
(Continued)

(52) U.S. Cl.
CPC .................. *F02C 6/16* (2013.01); *F03D 9/17* (2016.05); *F15B 1/024* (2013.01); *H02J 15/006* (2013.01);
(Continued)

(58) Field of Classification Search
CPC ...... F02C 6/16; F02C 1/04; F03D 9/17; F03D 9/18; F15B 1/024; H02J 15/006;
(Continued)

(56) References Cited

U.S. PATENT DOCUMENTS

| 4,523,432 A | * | 6/1985 | Frutschi | .................... F02C 6/14 60/659 |
| 8,247,915 B2 | * | 8/2012 | Crane | ..................... F04B 17/02 290/55 |

(Continued)

FOREIGN PATENT DOCUMENTS

JP      2016-121675 A      7/2016

*Primary Examiner* — Gerald L Sung
*Assistant Examiner* — Rene D Ford
(74) *Attorney, Agent, or Firm* — Studebaker & Brackett PC (57) ABSTRACT

In a main flow passage, a first heat exchanger, a first heat storage unit, a second heat exchanger, and a second heat storage unit are connected by a heating medium flow passage. The main flow passage allows a heating medium to be circulated. A sub flow passage includes a shortened flow passage which is a part of the heating medium flow passage and branches from the heating medium flow passage between the second heat exchanger and the second heat storage unit and extends to the first heat storage unit. The sub flow passage allows circulation of the heating medium between the first heat storage unit and the second heat exchanger. A first heating means in a middle of the shortened flow passage, the first heating means heating a passing heat medium, and a switching means conducting switching between the main flow passage and the sub flow passage are provided.

6 Claims, 5 Drawing Sheets

(51) Int. Cl.
  *F03D 9/17* (2016.01)
  *F15B 1/02* (2006.01)
  *F02C 1/04* (2006.01)
  *F28D 20/00* (2006.01)
  *F28F 27/02* (2006.01)
  *F03D 9/18* (2016.01)

(52) U.S. Cl.
  CPC .................. *F02C 1/04* (2013.01); *F03D 9/18* (2016.05); *F05D 2220/76* (2013.01); *F05D 2260/213* (2013.01); *F05D 2270/301* (2013.01); *F28D 20/0034* (2013.01); *F28F 27/02* (2013.01); *Y02E 60/14* (2013.01); *Y02E 60/16* (2013.01); *Y02E 70/30* (2013.01)

(58) Field of Classification Search
  CPC ........... F05D 2220/76; F05D 2260/213; F05D 2270/301; F28D 20/0034; F28F 27/02; Y02E 60/14; Y02E 60/16; Y02E 70/30; Y02E 10/72
  See application file for complete search history.

(56) References Cited

U.S. PATENT DOCUMENTS

| | | | |
|---|---|---|---|
| 8,261,552 B2 * | 9/2012 | Nakhamkin | F02C 1/04 60/659 |
| 2011/0094231 A1 * | 4/2011 | Freund | F02C 6/16 60/39.15 |
| 2017/0234171 A1 * | 8/2017 | Matsukuma | F01K 27/02 60/659 |
| 2018/0266315 A1 | 9/2018 | Kubo et al. | |

* cited by examiner

COMPRESSED AIR ENERGY STORAGE POWER GENERATION DEVICE

CROSS-REFERENCE TO RELATED APPLICATIONS

This is a national phase application in the United States of International Patent Application No. PCT/JP2018/010316 with an international filing date of Mar. 15, 2018, which claims priority of Japanese Patent Application No. 2017-084718 filed on Apr. 21, 2017, the contents of which are incorporated herein by reference."

TECHNICAL FIELD

The present disclosure relates to a compressed air energy storage power generation device.

BACKGROUND ART

Since power generation using renewable energy such as wind power generation and photovoltaic power generation depends on weather conditions, the output fluctuates and is not stabilized in some cases. Against such output fluctuations, a compressed air energy storage (CAES) system is known to serve as a system for leveling the output.

For example, JP 2016-121675 A discloses a CAES power generation device using a heat energy storage system.

However, in the CAES power generator disclosed in JP 2016-121675 A, no countermeasure is taken against the problem caused by lowering the temperature of the heat medium to increase viscosity.

SUMMARY OF THE INVENTION

Problems to be Solved by the Invention

An aspect of the present invention has an object to provide a compressed air energy storage power generation device capable of effectively preventing the temperature decrease in the heat medium to stabilize the fluid state of the heating medium.

Means for Solving the Problems

As a means for solving the problems, one aspect of the present invention provides a compressed air energy storage power generation device comprising:

a compressor that compresses air;

a pressure accumulation unit that stores a compressed air compressed by the compressor;

an expander driven by the compressed air supplied from the pressure accumulation unit;

a generator mechanically connected to the expander;

a first heat exchanger that conducts heat exchange between the heating medium and the compressed air supplied from the compressor to the pressure accumulation unit so as to cool the compressed air and heat a heating medium by exchanging heat a first heat storage unit that stores the heating medium heated by the first heat exchanger;

a second heat exchanger that conducts heat exchange between the compressed air supplied from the pressure accumulation unit to the expander and the heating medium supplied from the first heat storage unit so as to heat the compressed air and cool the heating medium;

a second heat storage unit that stores the heating medium cooled by the second heat exchanger and to supply the heating medium to the first heat exchanger;

a main flow passage in which the first heat exchanger, the first heat storage unit, the second heat exchanger, and the second heat storage unit are connected in this order by a heating medium flow passage, the main flow passage flowing a heating medium so that a heating medium circulates;

a sub flow passage including a shortened flow passage, the shortened passage being a part of the heating medium flow passage branching from the heating medium passage between the second heat exchanger and the second heat storage unit and extending to the first heat storage unit, the sub flow passage allowing circulation of the heating medium between the first heat storage unit and the second heat exchanger;

a first heating means that is provided in a middle of the shortened flow passage, and heats the heat medium passing therethrough; and a switching means that conducts switching between the main flow passage and the sub flow passage.

With this configuration, if the temperature of the heating medium in the first heat storage unit is low, the heating means can heat the heating medium while the switching means switches to the sub flow passage to circulate the heating medium. Therefore, the heating medium can be prevented from flowing with low temperature and high viscosity remained.

It is preferred that the compressed air energy storage power generation device further includes:

a first temperature detection means that detects a temperature of the heating medium in the first heat storage unit; and a control means, wherein when a first detected temperature by the first temperature detection means is less than an expected temperature, the control means switches the switching means to the sub flow passage and heats the heating medium with the first heating means, the expected temperature being a temperature of the heating medium expected to be raised by the first heating means, when the first detected temperature is not less than the expected temperature, the control means switches the switching means to the main flow passage.

With this configuration, since the main flow passage can be switched to the sub flow passage in consideration of the expected temperature, that is, the temperature of the heating medium passing through the heating means, it is possible to prevent wasteful heating by the heating means.

It is preferred that the compressed air energy storage power generation device further includes a volume detection means that detects a volume of the heating medium in the second heat storage unit, wherein when a detected volume by the volume detection means is larger than a set volume, and the first detected temperature is less than the expected temperature, the control means switches the switching means to the sub flow passage, and heats the heating medium with the first heating means, and when the detected volume is not more than a set volume, or the first detected temperature is not less than the expected temperature, the control means switches the switching means to the main flow passage.

With this configuration, since the sub flow passage or the main flow passage can be selected in consideration of the volume of the heating medium in the second heat storage unit during warm-up operation, the heating medium can be made to flow in an appropriate state as a whole system.

It is preferred that the compressed air energy storage power generation device further includes:

a flow rate detection means that is provided in a middle of the heating medium flow passage from the second heat exchanger to the first heating means, and detects a flow rate of a passing heating medium; and a second temperature detection means that is provided in a middle of the heating medium flow passage from the second heat exchanger to the first heating means, and detects a temperature of a passing heating medium, wherein the expected temperature achievable by the first heating medium is calculated based on a heating capacity of the first heating means, a heating medium flow rate detected by the flow rate detection means, and a second detected temperature detected by the second temperature detection means.

With this configuration, since it is possible to calculate the expected temperature by considering the heating capacity of the heating means, and the flow rate and temperature of the heating medium passing through the heating means, it is possible to determine more appropriately whether to switch to the sub flow passage.

It is preferred that the compressed air energy storage power generation device further includes:

a second heating means that heats the heating medium directed from the first heat exchanger toward the first heat storage unit; and a third temperature detection means that detects a temperature of the heating medium directed from the second heating means toward the first heat storage unit, wherein, when a third detected temperature by the third temperature detection means is not less than the first detected temperature, the control means heats the heating medium by the second heating unit.

With this configuration, it is possible to compensate for the insufficient temperature rise of the heating medium in the first heat exchanger by the second heating means, and it is possible to prevent the heating medium from reaching low temperature and having high viscosity.

It is preferred that the compressed air energy storage power generation device further includes a fourth temperature detection means that is provided in a region from the first heating means to the first heat storage unit in the shortened flow passage, and detects a temperature of the heating medium, wherein the control means adjusts a heating capacity of the first heating means based on a fourth detected temperature detected by the fourth temperature detection means.

With this configuration, it is possible to appropriately set the heating state by the first heating means according to the temperature rising state of the heating medium to save power.

According to one aspect of the present invention, since the sub flow passage is provided and the heating medium can be heated by the first heating means, it is possible to prevent that flowing the heating medium with low temperature and high viscosity remained causes a drift in the second heat exchanger. As a result, it is possible to avoid the occurrence of problems such as a decrease in power generation efficiency.

DESCRIPTION OF EMBODIMENTS

Hereinafter, an embodiment according to the present invention will be described with reference to the accompanying drawings. It should be noted that the following description is, fundamentally, merely illustrative and is not intended to limit the present invention, products to which the present invention is applied, or applications of the present invention. In addition, the drawings are schematic, and the ratio and the like of each dimension are different from actual ones.

Figure 1:
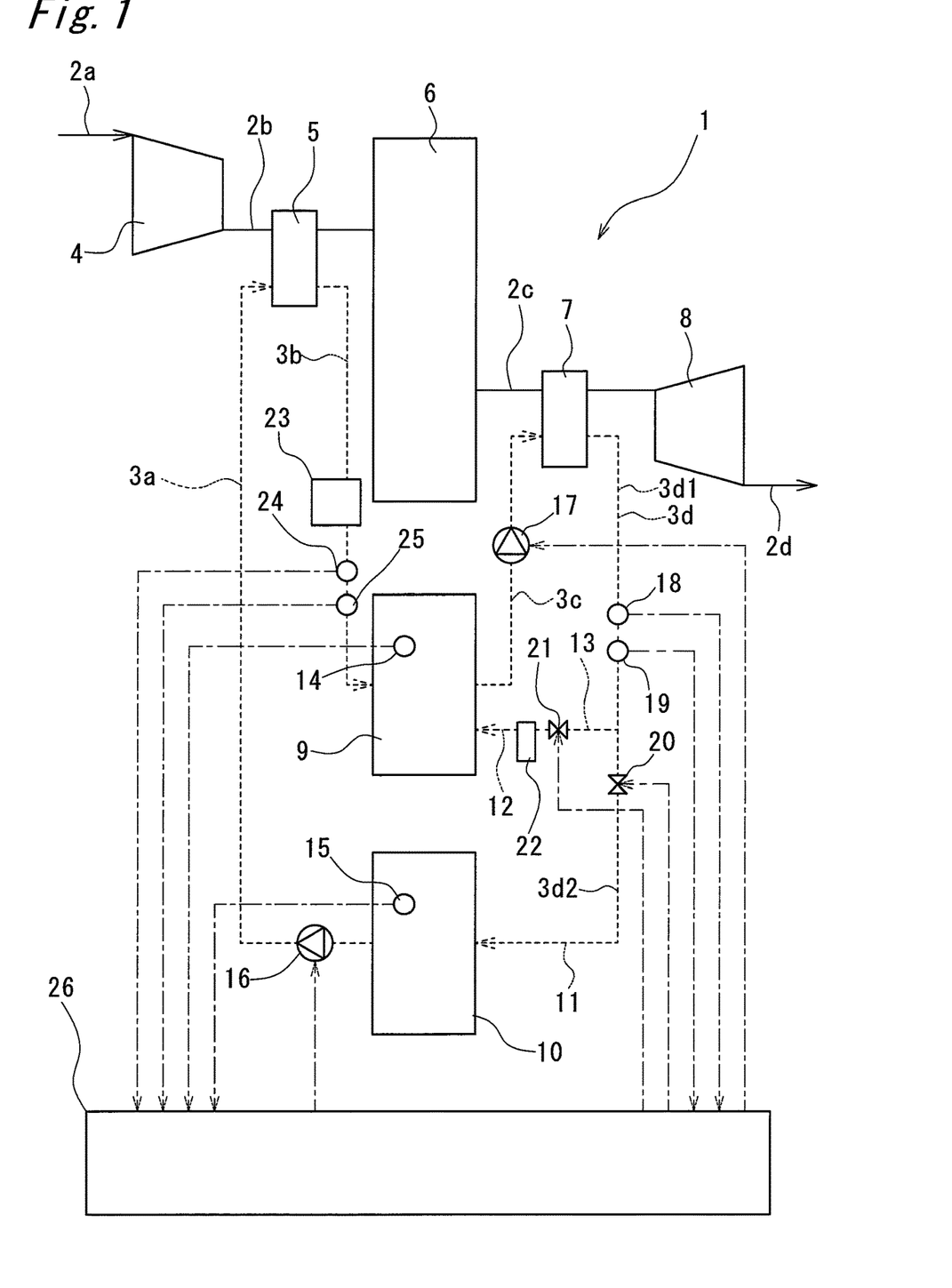
FIG. 1 is a block diagram schematically showing a compressed air energy storage power generation device according to the present embodiment.

FIG. 1 is a block diagram schematically showing a compressed air energy storage power generation device 1 according to the present embodiment. The compressed air energy storage power generation device 1 includes air flow passages 2a to 2d and heating medium flow passages 3a to 3d. In the drawing, the flow of air in the air flow passage 2 is indicated by a solid line, and the flow of the heating medium in the heating medium flow passage 3 is indicated by a dotted line.

(Air Flow Passage)

In the air flow passage 2, the compressor 4, the first heat exchanger 5, the pressure accumulation tank 6 being the pressure accumulation unit, the second heat exchanger 7, and the expander 8 are provided in this order from the upstream side of the air flow.

The compressor 4 is driven by a motor (not shown) to take in air from the intake port via the air flow passage 2a to compress the air inside to discharge it as compressed air from the discharge port. At this time, the compressed air is raised in temperature. It should be noted that for the compressor 4, for example, those of various types such as a screw type, a scroll type, a turbo type, and a reciprocating type can be used.

The first heat exchanger 5 cools the compressed air compressed by the compressor 4 supplied via the air flow passage 2b by heat exchange with a heating medium from the second heat storage tank 10 described below. Cooling the compressed air increases the density of the compressed air that can be stored in the pressure accumulation tank 6 and reduces the loss of thermal energy due to the heat radiation during storage.

The pressure accumulation tank 6 stores compressed air as energy. The pressure accumulation tank 6 is connected to the air supply port of the expander 8 via the air flow passage 2c. The compressed air delivered from the pressure accumulation tank 6 is supplied to the expanders 8 via the air flow passage 2c.

The second heat exchanger 7 heats the compressed air delivered from the pressure accumulation tank 6 with the heating medium from the first heat storage tank 9 described below. Heating the compressed air allows expansion by expander 8 to be smoothly performed, and power generation by a generator to be appropriately performed.

The expander 8 is driven by a motor (not shown) so that compressed air is supplied from the air supply port, and a generator (not shown) is driven by the supplied compressed air. In addition, the air expanded by the expander 8 is exhausted from the exhaust port through the air flow passage 2*d*. It should be noted that for the expander 8, for example, those of various types such as a screw type, a scroll type, a turbo type, and a reciprocating type can be used.

(Heating Medium Flow Passage)

The first heat exchanger 5, the first heat storage tank 9 being a first pressure accumulation unit, the second heat exchanger 7, and the second heat storage tank 10 being a second pressure accumulation unit are provided in the heating medium flow passage 3 in this order in the flow direction of the heating medium flowing annularly, which forms the main flow passage 11. In addition, a shortened flow passage 12 is connected to the heating medium flow passage 3*d* connecting the second heat exchanger 7 and the second heat storage tank 10 to branch to reach the first heat storage tank 9. Thus, a sub flow passage 13 in which the heating medium circulates is formed between the first heat storage tank 9 and the second heat exchanger 7. In addition, examples of usable heating mediums include those of various bases such as mineral oil base and glycol base.

The first heat exchanger 5 causes the heating medium supplied from the second heat storage tank 10 via the heating medium flow passage 3*a* to absorb heat from the compressed air compressed by the compressor 4. The heating medium absorbing heat to have high temperature flows to the first heat storage tank 9 via the heating medium flow passage 3*b*.

The first heat storage tank 9 and the second heat storage tank 10 have a heat insulated structure. In the first heat storage tank 9, a heating medium having absorbed heat from the compressed air with the first heat exchanger 5 to have high temperature is stored. The first heat storage tank 9 is provided with a first temperature detection sensor 14. The first temperature detection sensor 14 detects the temperature (first detected temperature) of the heating medium stored in the first heat storage tank 9 and outputs the first detected temperature to a control device 26 described below. In the second heat storage tank 10, the heating medium having dissipated heat into the compressed air with the second heat exchanger 7 to have low temperature is stored. The second heat storage tank 10 is provided with a water level detection sensor 15. The water level detection sensor 15 detects the water level of the heat medium to be stored, and outputs the detected water level to the control device 26 described below.

The second heat exchanger 7 causes the heating medium supplied from the first heat storage tank 9 by the driving of the second pump 17 to dissipate heat into the compressed air to be supplied to the expander 8. The heating medium having dissipated heat to have low temperature flows to the second heat storage tank 10.

The heating medium flow passage 3*a* connecting the second heat storage tank 10 and the first heat exchanger 5 is provided with a first pump 16. The drive of the first pump 16 forms a flow of the heat medium from the second heat storage tank 10 to the first heat storage tank 9 via the first heat exchanger 5.

The heating medium flow passage 3*c* connecting the first heat storage tank 9 and the second heat exchanger 7 is provided with a second pump 17. The drive of the second pump 17 forms a flow of a heating medium from the first heat storage tank 9 to the second heat storage tank 10 via the second heat exchanger 7, or a flow of a heating medium flowing in the shortened flow passage 12 and circulating between the first heat storage tank 9 and the second heat exchanger 7.

The heating medium flow passage 3*d* connecting the second heat exchanger 7 and the second heat storage tank 10 (the first region 3*d*1 on the upstream side of the heating medium flow with respect to the branch position of the shortened flow passage 12) is provided with a second temperature detection sensor 18. The temperature of the heating medium detected by the second temperature detection sensor 18 is output to the control device 26 described below as a third detected temperature.

In addition, the first region 3*d*1 of the heating medium flow passage 3*d* is provided with a first flow rate detection sensor 19, and the second region 3*d*2 on the downstream side with respect to the branch position is provided with a first on-off valve 20. The flow rate of the heating medium after passing through the second heat exchanger 7 detected by the first flow rate detection sensor 19 is output to a control device 26 described below as a detected flow rate. The first on-off valve 20 is for opening and closing the second region 3*d*2 of the heating medium flow passage 3*d*.

The shortened flow passage 12 is provided with a second on-off valve 21 for constituting a switching means together with the first on-off valve 20, and a first electric heater 22 being an example of a first heating means. The second on-off valve 21 is for opening and closing the shortened flow passage 12. The first electric heater 22 is for preventing the flow of the heating medium stored in the first heat storage tank 9 while the temperature is reduced during the warm-up operation. The heating capacity by the first electric heater 22, that is, the amount of heat per unit time that can be supplied to the passing heating medium is stored in advance in the storage unit of the control device 26. It should be noted that the heating capacity of the first electric heater 22 may be variable, and in such a case, the varied heating capacity has only to be updated in the storage unit as needed.

The heating medium flow passage 3*b* connecting the first heat exchanger 5 and the first heat storage tank 9 is provided with a third temperature detection sensor 24 for detecting the temperature of the heat medium passing therethrough and a second flow rate detection sensor 25 for detecting the flow rate, in addition to the second electric heater 23 being an example of the second heating means. The second electric heater 23 heats the passing heating medium to prevent the heating medium having a temperature lower than that of the heating medium stored in the first heat storage tank 9 from being supplied.

(Control Method)

Next, the operation of the CAES power generation device 1 configured as described above will be described. Here, the control contents by the control device 26 being the control means will be mainly described. Specifically, description will be made by dividing into warm-up operation processing, executed in warm-up operation, of raising the temperature of the heating medium stored in the first heat storage tank 9, low-power generation processing of reducing heating by the first electric heater 22, and low-power charging processing of reducing heating by the second electric heater 23.

Figure 5:
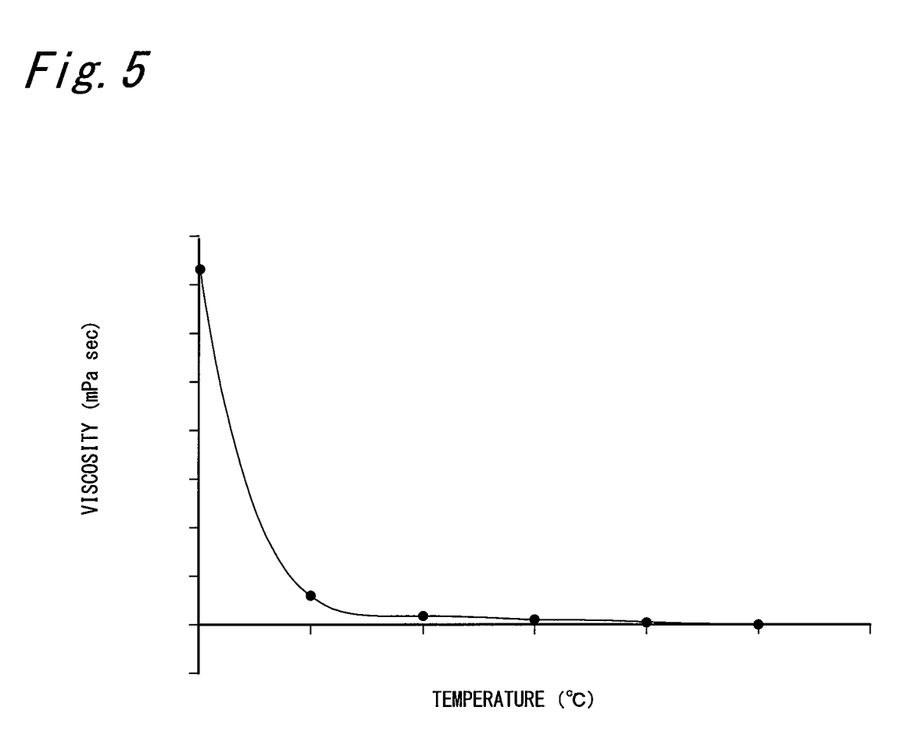
FIG. 5 is a graph showing a relationship between temperature and viscosity of a heating medium to be flown in the heating medium flow passage of the compressed air energy storage power generation device in FIG. 1.

It should be noted that the heating medium has a property that its viscosity changes depending on the temperature, and, for example, as shown in the graph of FIG. 5, the viscosity is rapidly increased when the temperature becomes a predetermined temperature (for example, 50° C.) or less. Then, when the viscosity of the heat medium increases and the fluid state deteriorates, the heat exchange performance in the second heat exchanger 7 decreases. As a result, the temperature of the compressed air to be supplied to the expander 8 cannot be sufficiently raised, and the power generation performance is degraded. In addition, when the power generation output is small, the flow rate of compressed air decreases, but even in that case, the rated flow rate must be secured so that heat exchange with the heating medium is appropriately performed, and what is called heating medium loss occurs. Thus, the following processing is performed in order to prevent the occurrence of such a problem.

(Warm-Up Operation Processing)

Figure 2:
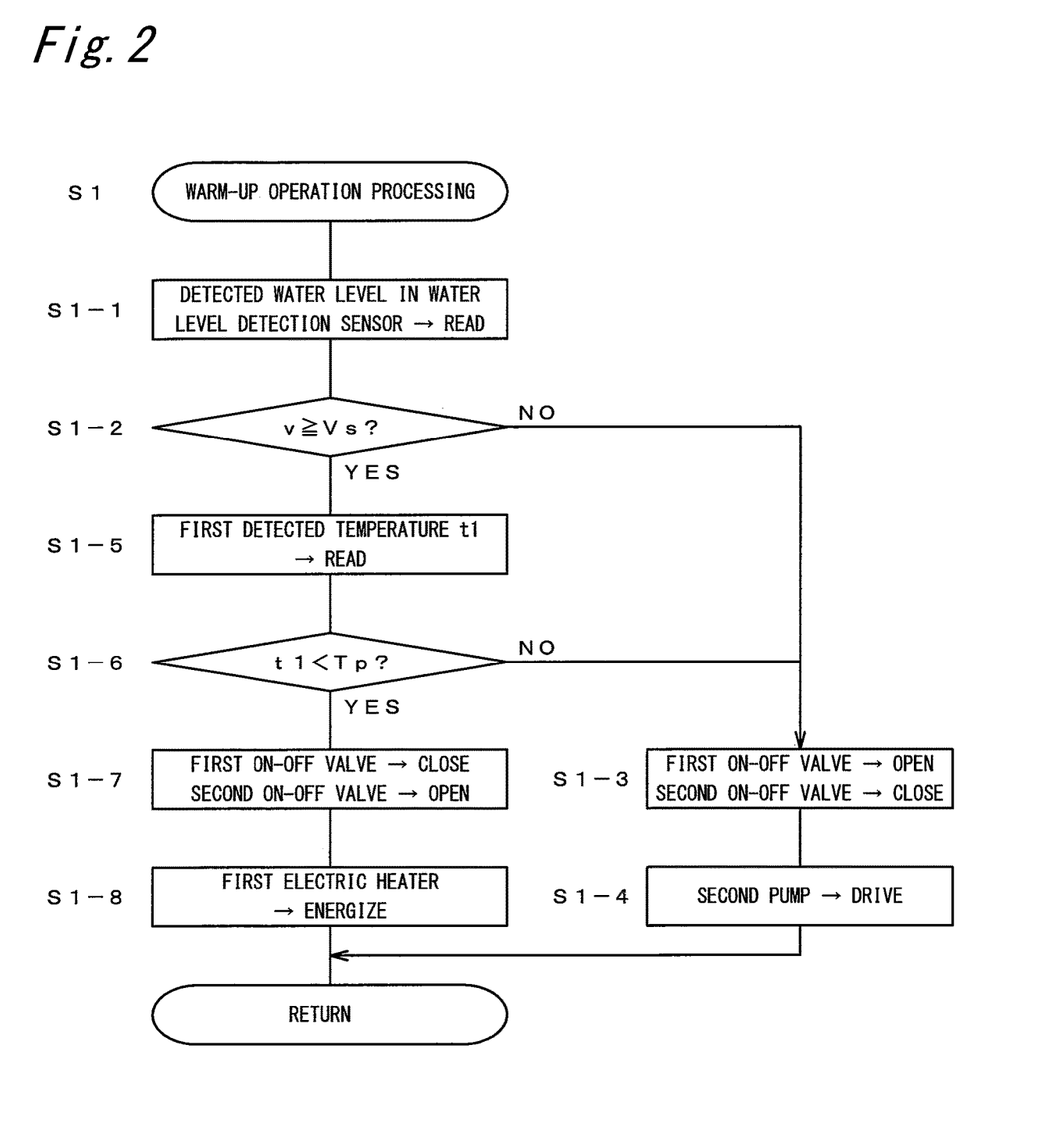
FIG. 2 is a flowchart showing warm-up operation processing by a control device in FIG. 1.

As shown in FIG. 2, in the warm-up operation processing (step S1), first, the process reads the detected water level in the water level detection sensor 15 provided in the second heat storage tank 10 (step S1-1). Then, the process calculates the volume of the heating medium stored in the second heat storage tank 10 based on the detected water level and determines whether the calculated volume v is not less than a preset set volume Vs (step S1-2).

If the calculated volume is less than the set volume (NO in step S1-2), the process opens the first on-off valve 20 and closes the second on-off valve 21 (step S1-3). Then, the process drives the second pump 17 (step S1-4), and causes the heating medium to flow from the first heat storage tank 9 to the second heat storage tank 10 as it is, via the second heat exchanger 7. Thus, the heating medium shortage in the second heat storage tank 10 is eliminated.

If the calculated volume v is not less than the set volume Vs (YES in step S1-2), the process reads the first detected temperature t1 being the temperature of the heating medium in the first heat storage tank 9 detected by the first temperature detection sensor 14 (step S1-5). Then, the process determines whether the first detected temperature t1 is less than an expected temperature Tp (step S1-6). Here, the expected temperature Tp, which is the temperature of the heating medium expected to be obtained after passing through the first electric heater 22, is calculated based on the second detected temperature of the heating medium detected by the second temperature detection sensor 18, the detected flow rate of the heating medium detected by the first flow rate detection sensor 19, and the heating capacity of the first electric heater 22. That is, it is calculated how many degrees the heating medium can be raised in temperature from the amount of heat that can be supplied per unit time by the first electric heater 22 and the flow rate of the passing heating medium. Then, the expected temperature Tp can be obtained by adding the raised temperature to the temperature of the heating medium before passing. In addition, the expected temperature Tp is preferably set to a value higher than a critical temperature (here, 50° C.) at which at least the viscosity of the heating medium increases rapidly. Then, the heating capacity of the first electric heater 22 is suitably the heating capacity in which the heating medium after passing through the first electric heater 22 exceeds the critical temperature even if the passing heating medium is at the maximum value in amount and at the minimum temperature.

If the first detected temperature t1 is lower than the expected temperature Tp (YES in step S1-6), keeping performing power generation processing or charging processing as it is results in supplying a heating medium with low temperature and high viscosity to the second heat exchanger 7, which may cause problems as described above to occur. Thus, the process closes the first on-off valve 20 and opens the second on-off valve 21 (step S1-7). In addition, the process starts energization of the first electric heater 22 (step S1-8). Thus, the heating medium discharged from the first heat storage tank 9 to pass through the second heat exchanger 7 flows in the shortened flow passage 12 to be heated by the first electric heater 22. Then, the heating medium heated here can raise the temperature of the heating medium in the first heat storage tank 9. Therefore, a problem such as the heating medium being increased in viscosity to be a drift in the second heat exchanger 7 does not occur.

On the other hand, if the first detected temperature t1 is not less than the expected temperature Tp (NO in step S1-6), the temperature of the heating medium in the first heat storage tank 9 is high, and no problem is considered to occur even if the heating medium is supplied to the second heat exchanger 7 as it is, so that the process opens the first on-off valve 20 and closes the second on-off valve 21 (step S1-3). Then, the process drives the second pump 17 (step S1-4), and causes the heating medium to flow from the first heat storage tank 9 to the second heat storage tank 10 as it is, via the second heat exchanger 7.

Thus, according to the warm-up operation processing, if the temperature of the heating medium in the first heat storage tank 9 has decreased, the heating medium is heated by the first electric heater 22 while being circulated in the sub flow passage 13, so that the heating medium is not supplied to the second heat exchanger 7 while remained at low temperature. Therefore, it is possible to prevent the heating medium from remaining high in viscosity to cause a drift in the second heat exchanger 7. However, if the volume of the heating medium stored in the second heat storage tank 10 is insufficient, in consideration of the fluid state of the heating medium as a whole system, the supply of the heating medium into the second heat storage tank 10 is prioritized without the heating medium flowing in the sub flow passage 13.

(Low-Power Generation Processing)

Figure 3:
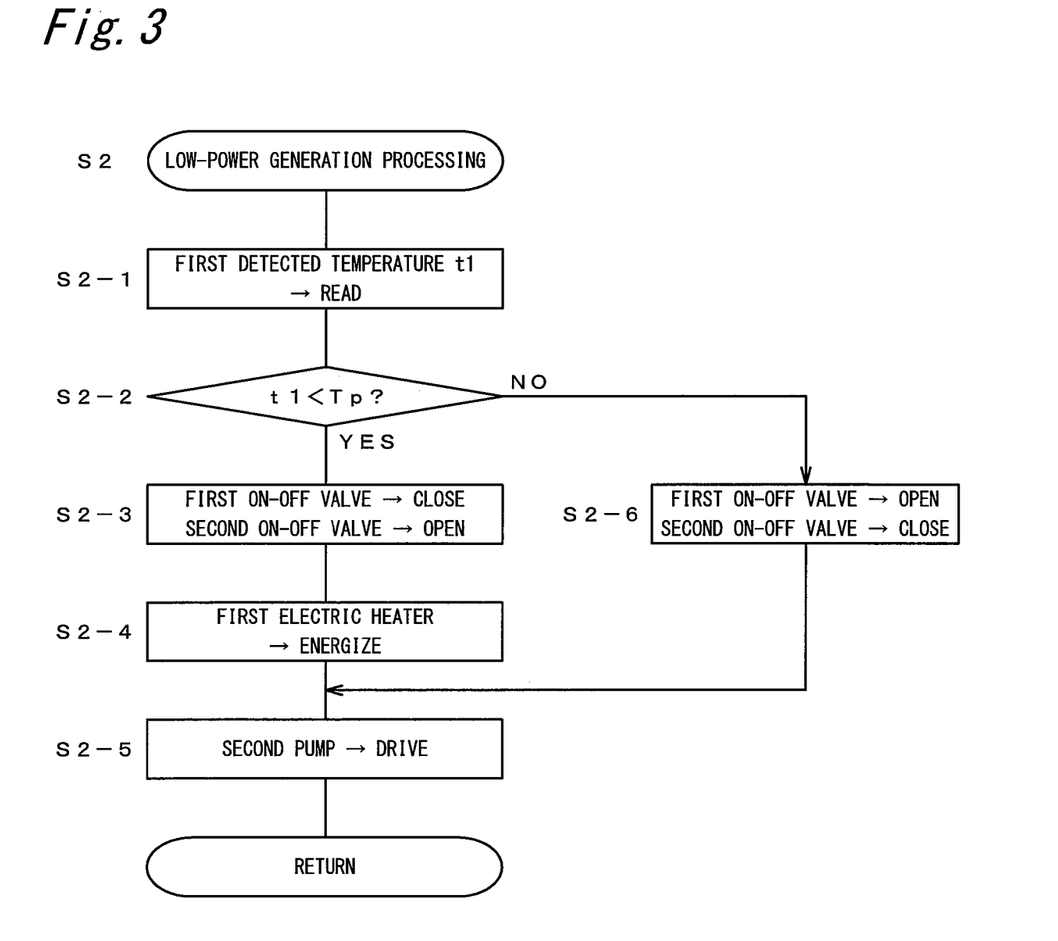
FIG. 3 is a flowchart showing low-power generation processing by the control device in FIG. 1.

The low-power generation processing is processing performed when the required generation power output is small. That is, if the temperature of the heating medium is low and the viscosity of the heating medium is high, it is necessary to secure the rated flow rate so that no drift occurs in the second heat exchanger 7, and this problem is solved as follows.

As shown in FIG. 3, in the low-power generation processing (step S2), the process reads the first detected temperature t1 being the temperature of the heating medium in the first heat storage tank 9 detected by the first temperature detection sensor 14 (step S2-1). Then, the process determines whether the first detected temperature t1 is less than the expected temperature Tp (step S2-2).

If the first detected temperature t1 is less than the expected temperature Tp (YES in step S2-2), the process closes the first on-off valve 20 and opens the second on-off valve 21 (step S2-3). In addition, the process starts energization of the first electric heater 22 (step S2-4). Then, the process drives the second pump 17 (step S2-5). Thus, the heating medium passes through the second heat exchanger 7 from the first heat storage tank 9, and then flows in the shortened flow passage 12 to be heated by the first electric heater 22. The heating medium in the first heat storage tank 9 can be raised in temperature by the heated heating medium. Therefore, a problem such as the heating medium being increased in viscosity to be a drift in the second heat exchanger 7 does not occur.

On the other hand, if the first detected temperature t1 is not less than the expected temperature Tp (NO in step S2-2), the temperature of the heating medium in the first heat storage tank 9 is high, and no problem is considered to occur even if the heating medium is supplied to the second heat exchanger 7 as it is, so that the process opens the first on-off valve 20 and closes the second on-off valve 21 (step S2-6). Then, the process drives the second pump 17 (step S2-5), and causes the heating medium to flow from the first heat storage tank 9 to the second heat storage tank 10 as it is, via the second heat exchanger 7.

Thus, also in the low-power generation processing, as in the warm-up operation processing, if the temperature of the heating medium in the first heat storage tank 9 is low, the first electric heater 22 can heat the passing heating medium to reduce the viscosity.

(Low-Power Charging Processing)

Figure 4:
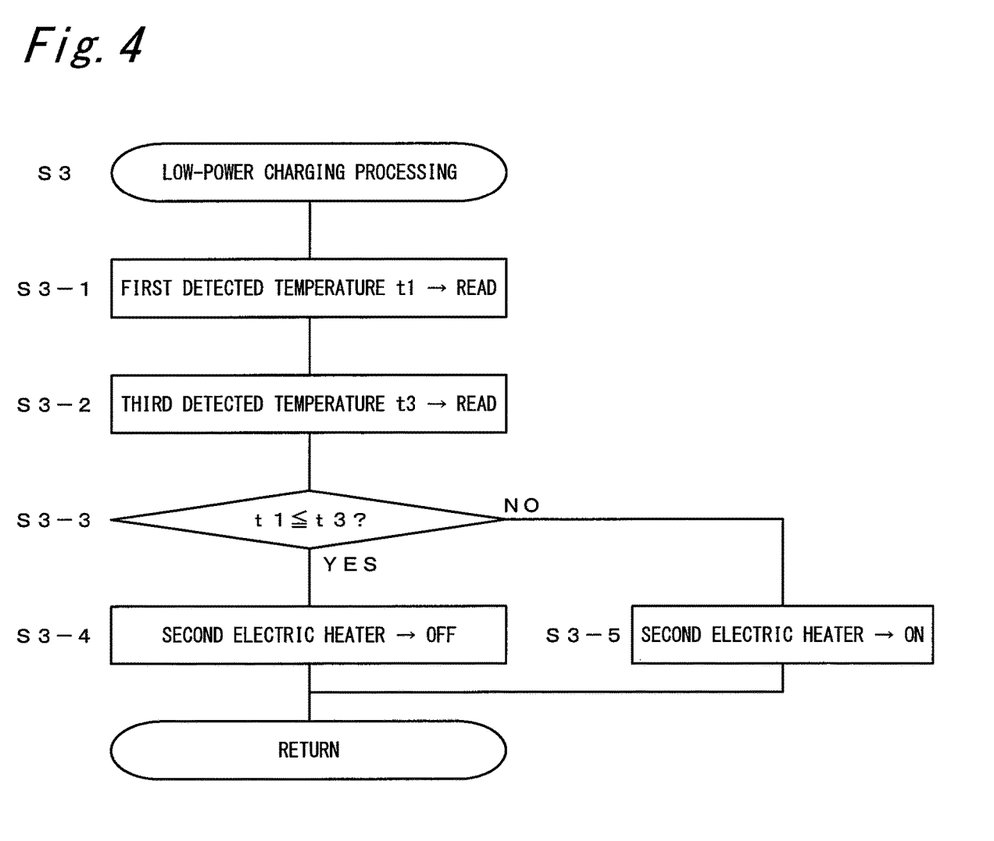
FIG. 4 is a flowchart showing low-power charging processing by the control device in FIG. 1.

The low-power charging processing is processing when the input power from the power generation device such as wind power generation is small and the motor for driving the compressor 4 cannot be sufficiently rotated. When the temperature of the heating medium is low and the viscosity of the heating medium is high, the drive of the compressor 4 reaching low-powered may cause a drift in the first heat exchanger 5, so that the following low-power charging processing is performed.

As shown in FIG. 4, in the low-power charging processing (step S3), the process reads the temperature (first detected temperature t1) of the heating medium in the first heat storage tank 9 with the first temperature detection sensor 14 (step S3-1). In addition, the process reads a third detected temperature t3 being a temperature of the heating medium supplied to the first heat storage tank 9 detected by the third temperature detection sensor 24 (step S3-2). Then, the process determines whether the third detected temperature t3 is not less than the first detected temperature t1 (step S3-3).

If the third detected temperature t3 is not less than the first detected temperature t1 (YES in step S3-3), since a heating medium having a temperature higher than that of the heating medium stored in the first heat storage tank 9 can be supplied, the process sets a stop state of energization to the second electric heater 23 (OFF) (step S3-4). Thus, unnecessary power consumption can be prevented.

On the other hand, if the third detected temperature t3 is less than the first detected temperature t1 (NO in step S3-3), since supplying the heating medium from the first heat exchanger 5 as it is to the first heating medium tank will cool the heating medium in the first heating medium tank, the process starts energization of the second electric heater 23 (ON) (step S3-5). Thus, it is possible to prevent the heating medium in the first heating medium tank from decreasing in temperature and circulating in the second heat exchanger 7 in a state of high viscosity.

It should be noted that the present invention is not limited to the configuration described in the above embodiment, and various modifications are possible.

In the above embodiment, the heating capacity of the first electric heater 22 and the second electric heater 23 is set to be constant, but may be variable.

For example, in the shortened flow passage 12, a fourth temperature detection sensor (not shown) may be newly provided in the region from the first electric heater 22 to the first heat storage tank 9, and the heating capacity of the first electric heater 22 may be varied based on a fourth detected temperature detected here. That is, circulating the heating medium in the sub flow passage 13 by driving the second pump 17 causes the heating medium to be heated by the first electric heater 22 to be gradually raised in temperature. Therefore, the temperature of the heating medium supplied to the first heat storage tank 9 is raised higher than necessary. Therefore, the heating capacity of the first electric heater 22 is gradually reduced according to a rise in the fourth detected temperature. Thus, wasteful power consumption in the first electric heater 22 can be prevented.

In addition, the heating capacity of the second electric heater 23 may be varied based on the third detected temperature detected by the third temperature detection sensor 24. That is, when heating the passing heating medium with the second electric heater 23 raises the temperature of the heating medium, the heating capacity of the second electric heater 23 is gradually reduced according to the temperature rise. Thus, wasteful power consumption in the second electric heater 23 can be prevented.

The invention claimed is:

1. A compressed air energy storage power generation device comprising:
   a compressor that compresses air;
   a pressure accumulation unit that stores a compressed air compressed by the compressor;
   an expander driven by the compressed air supplied from the pressure accumulation unit;
   a generator mechanically connected to the expander;
   a first heat exchanger that conducts heat exchange between a heating medium and the compressed air supplied from the compressor to the pressure accumulation unit so as to cool the compressed air and heat the heating medium by exchanging heat;
   a first heat storage unit that stores the heating medium heated by the first heat exchanger;
   a second heat exchanger that conducts heat exchange between the compressed air supplied from the pressure accumulation unit to the expander and the heating medium supplied from the first heat storage unit so as to heat the compressed air and cool the heating medium;
   a second heat storage unit that stores the heating medium cooled by the second heat exchanger and to supply the heating medium to the first heat exchanger;
   a main flow passage in which the first heat exchanger, the first heat storage unit, the second heat exchanger, and the second heat storage unit are connected in this order by a heating medium flow passage, the main flow passage flowing the heating medium so that the heating medium circulates;
   a sub flow passage including a shortened flow passage, the shortened passage being a part of the heating medium flow passage branching from the heating medium passage between the second heat exchanger and the second heat storage unit and extending to the first heat storage unit, the sub flow passage allowing circulation of the heating medium between the first heat storage unit and the second heat exchanger;
   a first heater that is provided in a middle of the shortened flow passage, and that heats the heat medium passing therethrough; and
   a switch that conducts switching between the main flow passage and the sub flow passage.

2. The compressed air energy storage power generation device according to claim 1, further comprising:
   a first temperature detector that detects a temperature of the heating medium in the first heat storage unit; and
   a controller, wherein
      when a first detected temperature by the first temperature detector is less than an expected temperature, the controller switches the switch to the sub flow passage and heats the heating medium with the first heater, the expected temperature being a temperature of the heating medium expected to be raised by the first heater, and when the first detected temperature is not less than the expected temperature, the controller switches the switch to the main flow passage.

3. The compressed air energy storage power generation device according to claim 2, further comprising a volume detector that detects a volume of the heating medium in the second heat storage unit, wherein when a detected volume by the volume detector is larger than a set volume, and the first detected temperature is less than the expected temperature, the controller switches the switch to the sub flow passage, and heats the heating medium with the first heater, and when the detected volume is not more than the set volume, or the first detected temperature is not less than the expected temperature, the controller switches the switch to the main flow passage.

4. The compressed air energy storage power generation device according to claim 2, further comprising:

a flow rate detector that is provided in a middle of the heating medium flow passage from the second heat exchanger to the first heater, and detects a flow rate of a passing heating medium; and a second temperature detector that is provided in a middle of the heating medium flow passage from the second heat exchanger to the first heater, and detects a temperature of the passing heating medium, wherein the expected temperature achievable by the passing heating medium is calculated based on a heating capacity of the first heater, a heating medium flow rate detected by the flow rate detector, and a second detected temperature detected by the second temperature detector.

5. The compressed air energy storage power generation device according to claim 2, further comprising:

a second heater that heats the heating medium directed from the first heat exchanger toward the first heat storage unit; and a third temperature detector that detects a temperature of the heating medium directed from the second heater toward the first heat storage unit, wherein, when a third detected temperature by the third temperature detector is not less than the first detected temperature, the controller heats the heating medium by the second heater.

6. The compressed air energy storage power generation device according to claim 2, further comprising a fourth temperature detector that is provided in a region from the first heater to the first heat storage unit in the shortened flow passage, and detects a temperature of the heating medium, wherein the controller adjusts a heating capacity of the first heater based on a fourth detected temperature detected by the fourth temperature detector.

* * * * *